US012779503B2

(12) United States Patent
Cao et al.

(10) Patent No.: US 12,779,503 B2
(45) Date of Patent: Nov. 3, 2026

(54) CLEANING APPARATUS, BATTERY PROCESSING DEVICE, AND BATTERY PROCESSING METHOD

(71) Applicant: CONTEMPORARY AMPEREX TECHNOLOGY (HONG KONG) LIMITED, Hong Kong (CN)

(72) Inventors: Wei Cao, Ningde (CN); Shunlin Liao, Ningde (CN); Deyi Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 238 days.

(21) Appl. No.: 18/419,269

(22) Filed: Jan. 22, 2024

(65) Prior Publication Data

US 2024/0424535 A1 Dec. 26, 2024

Related U.S. Application Data

(63) Continuation of application No. PCT/CN2023/101914, filed on Jun. 21, 2023.

(51) Int. Cl.

*B08B 1/34* (2024.01)
*B08B 1/12* (2024.01)
*B08B 5/02* (2006.01)
*B08B 15/00* (2006.01)
*B08B 15/04* (2006.01)

(52) U.S. Cl.

CPC .................. *B08B 1/34* (2024.01); *B08B 1/12* (2024.01); *B08B 5/02* (2013.01); *B08B 15/002* (2013.01); *B08B 15/04* (2013.01)

(58) Field of Classification Search

CPC .... B08B 1/34; B08B 1/12; B08B 5/02; B08B 15/002; B08B 15/04; B08B 1/20; B08B 1/32; B08B 6/00; H01M 10/0404

See application file for complete search history.

(56) References Cited

FOREIGN PATENT DOCUMENTS

| | | | |
|---|---|---|---|
| CN | 201913090 | * | 8/2011 |
| CN | 201913090 U | | 8/2011 |
| CN | 102343344 | * | 2/2012 |
| CN | 202356361 | * | 8/2012 |
| CN | 102500580 | * | 9/2013 |
| CN | 103785633 | * | 5/2014 |
| CN | 103785633 A | | 5/2014 |
| CN | 105977547 | * | 9/2018 |
| CN | 110062667 A | | 7/2019 |
| CN | 212442229 U | | 2/2021 |

(Continued)

OTHER PUBLICATIONS

The European Patent Office (EPO) The Extended European Search Report for Application No. 23812839.1 Feb. 28, 2025 10 Pages.

(Continued)

*Primary Examiner* — Michael E Barr

(74) *Attorney, Agent, or Firm* — ANOVA LAW GROUP, PLLC

(57) ABSTRACT

A cleaning apparatus configured to clean a surface of a cell includes a workbench, a cleaning member, and a driving mechanism. The cleaning member is movably disposed at the workbench. The driving mechanism is disposed at the workbench and configured to drive the cleaning member to move so as to allow the cleaning member to perform a frictional motion relative to the surface of the cell.

12 Claims, 6 Drawing Sheets

(56) References Cited

FOREIGN PATENT DOCUMENTS

| | | | | |
|---|---|---|---|---|
| CN | 213051681 | U | | 4/2021 |
| CN | 113600528 | A | | 11/2021 |
| CN | 218340448 | | * | 1/2023 |
| CN | 218340448 | U | | 1/2023 |
| CN | 218575329 | U | | 3/2023 |
| CN | 115157070 | B | | 4/2023 |
| CN | 218797810 | U | | 4/2023 |
| CN | 218902799 | | * | 4/2023 |
| CN | 218902799 | U | | 4/2023 |
| DE | 102012017458 | A1 | | 3/2014 |
| JP | H1157631 | A | | 3/1999 |

OTHER PUBLICATIONS

State Intellectual Property Office of China The First Office Action for Application No. 202380060318.6 Jul. 26, 2025 13 pages (including translation).

The World Intellectual Property Organization (WIPO) International Search Report for PCT/CN2023/101914 Dec. 21, 2023 7 pages (including English translation).

* cited by examiner

CLEANING APPARATUS, BATTERY PROCESSING DEVICE, AND BATTERY PROCESSING METHOD

CROSS-REFERENCE TO RELATED APPLICATION

This application is a continuation of International Application No. PCT/CN2023/101914, filed on Jun. 21, 2023, the entire content of which is incorporated herein by reference.

TECHNICAL FIELD

This application relates to the field of battery technologies, and specifically, to a cleaning apparatus, a battery processing device, and a battery processing method.

BACKGROUND

In a battery processing technique, the surfaces of cells are likely to adsorb impurities such as foam particles and dust. Therefore, after the cells are stacked to form a battery, impurities are brought into the battery, affecting the quality of the battery.

SUMMARY

In view of the foregoing problem, embodiments of this application provide a cleaning apparatus, a battery processing device, and a battery processing method to alleviate the problem that impurities are brought into the battery.

The embodiments of this application adopt the following technical solutions.

According to a first aspect, an embodiment of this application provides a cleaning apparatus including:

- a workbench;
- a cleaning member movably disposed at the workbench; and
- a driving mechanism disposed at the workbench and configured to drive the cleaning member to move so as to allow the cleaning member to perform a frictional motion relative to a surface of a cell.

With such an arrangement, in a battery processing technique, the cleaning member can be driven by the driving mechanism to perform a frictional motion relative to the surface of the cell, such that the surface of the cell is cleaned and impurities on the surface of the cell are removed, alleviating the problem that the impurities are brought into the battery, thereby improving product quality of the battery.

In some embodiments, the cleaning member is rotatably disposed at the workbench, to be rotatable relative to the cell.

With such an arrangement, the cleaning member can perform a frictional motion relative to the surface of the cell to remove impurities on the surface of the cell.

In some embodiments, the cleaning member is movably disposed at the workbench to be movable relative to the cell.

With such an arrangement, the cleaning member can perform a frictional motion relative to the surface of the cell to remove impurities on the surface of the cell.

In some embodiments, the cleaning member includes a roll shaft and a plurality of elastic strips. The roll shaft is connected to an output end of the driving mechanism. The plurality of elastic strips are spaced apart on the roll shaft and are configured to come into elastic contact with the surface of the cell so as to clean the surface of the cell.

With such an arrangement, the cleaning member can smoothly perform a frictional motion relative to the cell, and the cleaning member can provide a strong force capable of removing the impurities on the surface of the cell, so that the cleaning member can better clean the surface of the cell.

In some embodiments, the cleaning member is partially disposed inside the workbench and at least partially exceeds a surface of the workbench.

With such an arrangement, it is convenient for the cleaning member to come into contact with the surface of the cell and generate friction with the surface of the cell, thereby allowing the cleaning member to conveniently clean the surface of the cell.

In some embodiments, the cleaning apparatus further includes a dust collection hood disposed at the workbench. The dust collection hood is disposed opposite the cleaning member to receive impurities removed by the cleaning member.

With such an arrangement, the dust collection hood can receive the impurities removed from the surface of the cell by the cleaning member, allowing the cleaning apparatus to achieve an effect of cleaning the entire operating environment and also alleviating the problem that the cleaning effect of the cleaning member is affected due to the impurities remaining on the cleaning member.

In some embodiments, the cleaning apparatus further includes a dust sucking apparatus. The dust sucking apparatus is connected to the dust collection hood to suck out impurities removed by the cleaning member.

In this way, the impurities removed from the surface of the cell by the cleaning member do not affect the effect of cleaning the entire operating environment and do not affect the cleaning effect of the cleaning member as well.

In some embodiments, the cleaning apparatus further includes an ion air knife disposed at the workbench. The ion air knife is spaced apart from the cleaning member and is configured to exhaust air toward the cell.

In this way, static electricity on the surface of the cell can be eliminated, such that the surface of the cell is less likely to adsorb impurities, thereby alleviating the problem that impurities are adsorbed onto the surface of the cell and are consequently brought into the battery.

In some embodiments, the cleaning member and the ion air knife are spaced apart from each other in a first direction. The ion air knife includes an air outlet. The air outlet faces the cleaning member in a direction oblique to the first direction and is configured for exhausting air toward the cell.

With such an arrangement, the ion air knife can blow out ion air toward a plurality of surfaces of the cell so as to eliminate static electricity on the plurality of surfaces of the cell, thereby alleviating the problem that impurities are adsorbed onto the surfaces of the cell.

In some embodiments, the cleaning member and the ion air knife are spaced apart from each other in a first direction, and two opposite sides of the cleaning member in the first direction each are provided with the ion air knife.

With such an arrangement, the ion air knives on the two opposite sides of the cleaning member in the first direction can both exhaust air toward the cell, thereby jointly eliminating static electricity on surfaces of two opposite sides of the cell in the first direction.

In some embodiments, the ion air knife includes an air outlet. The ion air knife is rotatably disposed at the workbench to adjust orientation of the air outlet during rotation.

With such an arrangement, the ion air knife is rotatable to adjust the orientation of the air outlet, allowing the ion air knife to conveniently exhaust air toward the cell via the air outlet so as to eliminate static electricity on the surface of the cell.

In some embodiments, the cleaning apparatus further includes a rotating structure. The rotating structure includes a fixed arm disposed at the workbench and a rotating arm rotatably connected to the fixed arm. The ion air knife is disposed on the rotating arm.

In this way, the orientation of the air outlet of the ion air knife can be adjusted, allowing ion air blown out by the ion air knife to eliminate static electricity on the surface of the cell.

In some embodiments, the fixed arm is provided with a first fixing hole; the rotating arm is provided with a second fixing hole opposite the first fixing hole; the first fixing hole and the second fixing hole are both spaced apart from a rotating axis of the rotating arm; and the first fixing hole and the second fixing hole are configured for fixation using a fastener.

With such an arrangement, angle adjustment and position limitation of the ion air knife can be implemented, providing great convenience in operation.

In some embodiments, the workbench is provided with an air outlet window for the ion air knife to exhaust air, and the air outlet window is provided with a protective net.

The air outlet window being provided with the protective net can alleviate the problem that an operator accidentally comes into contact with the ion air knife and accordingly alleviates the problem of injuries to the operator caused by accidental contact with the ion air knife, thereby improving the safety performance of the cleaning apparatus.

In some embodiments, the cleaning apparatus further includes an ion fan. An air outlet end of the ion fan is connected to the ion air knife.

With such an arrangement, static electricity on the surface of the cell can be eliminated via ion air blown out of the ion fan.

According to a second aspect, an embodiment of this application provides a battery processing device including a cleaning apparatus.

According to the battery processing device provided in this embodiment of this application, impurities on a surface of a cell can be removed by the cleaning apparatus mentioned above, alleviating the problem that the impurities are brought into a battery, thereby improving product quality of the battery.

According to a third aspect, an embodiment of this application provides a battery processing method adopting a battery processing device and including the following steps:

driving a cell to be transferred to a cleaning apparatus; and driving a cleaning member of the cleaning apparatus to move so as to allow the cleaning member to perform a frictional motion relative to a surface of the cell.

According to the battery processing method provided in this embodiment of this application, impurities on the surface of the cell can be removed using the battery processing device mentioned above, alleviating the problem that the impurities are brought into a battery, thereby improving product quality of the battery.

In an embodiment, the battery processing method further includes: driving an ion air knife of the cleaning apparatus to exhaust air toward the cell.

With such an arrangement, static electricity on the surface of the cell can be eliminated, such that the surface of the cell is less likely to adsorb impurities, thereby alleviating the problem that impurities are adsorbed onto the surface of the cell and are consequently brought into the battery.

In an embodiment, the battery processing method further includes: driving the cell to move along a distribution direction of the ion air knife and the cleaning member.

With such an arrangement, it is convenient for the cleaning member to clean the surface of the cell, and an effect of eliminating static electricity on a plurality of surfaces of the cell can be achieved.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for the embodiments or demonstrative technical description. Apparently, the accompanying drawings in the following description show merely some embodiments of this application, and persons of ordinary skill in the art may still derive other drawings from these accompanying drawings without creative efforts.

REFERENCE SIGNS IN THE FIGURES

Figure 1:
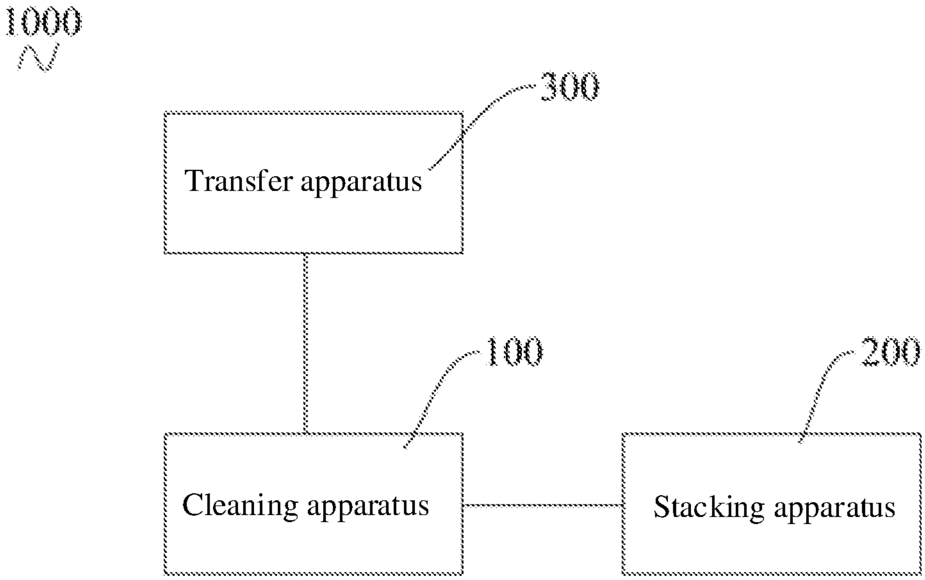
FIG. 1 is a schematic diagram of a battery processing device according to some embodiments of this application.

1000. battery processing device; 100. cleaning apparatus; 200. stacking apparatus; 300. transfer apparatus; 10. cleaning member; 11. roll shaft; 12. elastic strip; 20. driving mechanism; 21. motor; 22. shaft coupler; 30. workbench; 301. bench surface; 302. cleaning window; 303. air outlet window; 40. ion air knife; 401. air outlet; 50. dust collection hood; 501. dust inlet; 502. dust outlet; 60. rotating structure; 61. fixed arm; 62. rotating arm; 601. first fixing hole; 602. second fixing hole; 70. protective net; Y first direction; Z. second direction; and X. third direction.

DESCRIPTION OF EMBODIMENTS

The embodiments of this application are described in detail below. Examples of the embodiments are shown in the accompanying drawings, and reference signs that are the same or similar always indicate the same or similar elements or elements with the same or similar functions. The embodiments described below with reference to the accompanying drawings are illustrative and merely for explaining this application. They should not be construed as limitations on this application.

In the descriptions of this application, it should be understood that the orientations or positional relationships indicated by the terms “length”, “width”, “upper”, “lower”, "front", "rear", "left", "right", "perpendicular", "horizontal", "top", "bottom", "inside", "outside", and the like are based on the orientations or positional relationships shown in the accompanying drawings. These terms are merely for ease and brevity of description of this application rather than indicating or implying that the apparatuses or components mentioned must have specific orientations or must be constructed or manipulated according to specific orientations, and therefore shall not be construed as any limitation on this application.

In addition, the terms "first" and "second" are merely for the purpose of description, and shall not be understood as any indication or implication of relative importance or any implicit indication of the number of technical features indicated. Therefore, a feature limited by "first" or "second" can explicitly or implicitly include one or more such features.

In the description of this application, "a plurality of" means more than two unless otherwise specifically stated, and "more than two" includes two. Correspondingly, "a plurality of groups" means more than two groups, including two groups.

In the description of this application, unless otherwise specified and defined explicitly, the terms "mounting", "connection", "join", and "fastening" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skills in the art can understand specific meanings of these terms in this application as appropriate to specific situations.

In the description of this application, the term "and/or" is only an associative relationship for describing associated objects, indicating that three relationships may be present. For example, A and/or B may indicate the following three cases: presence of A, presence of both A and B, and presence of B. In addition, the character "/" in this application generally indicates an "or" relationship between the contextually associated objects.

Although this application has been described with reference to some embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

In a battery processing technique, typically cells are taken out of a foam package first, subjected to operations such as inspection and gluing, and then stacked to form a battery.

In some cases, static electricity may be generated due to friction between the cells and the foam package, making the surfaces of the cells easily adsorb impurities such as foam particles and dust. Therefore, after the cells are assembled into a battery, the impurities are brought into the battery, affecting the quality of the battery.

In view of the foregoing consideration, an embodiment of this application provides a cleaning apparatus, a battery processing device, and a battery processing method. In a battery processing technique, a cleaning member can be driven by a driving mechanism to perform a frictional motion relative to a surface of a cell, such that the surface of the cell is cleaned and impurities on the surface of the cell are removed, alleviating the problem that the impurities are brought into the battery, thereby improving product quality of the battery.

The battery according to this embodiment of this application may refer to a single physical module that includes one or more battery cells for providing a higher voltage and capacity. When a plurality of battery cells are provided, the plurality of battery cells are connected in series, parallel, or series-parallel via a busbar, where being connected in series-parallel means a combination of series and parallel connections of the plurality of battery cells.

In some embodiments, the battery may be a battery module. When a plurality of battery cells are provided, the plurality of battery cells are arranged and fixed to form a battery module. In an example, the plurality of battery cells may be fixed using a rolling strip or the like to form a battery module. In an example, the plurality of battery cells may alternatively be fixed using an end plate, a side plate, or the like to form a battery module.

In some embodiments, the battery may be a battery pack, and the battery pack may include a box and a battery cell. In an example, the battery cell may be directly accommodated in the box. In an example, the battery cell may form a battery module first and then is accommodated in the box.

The cell according to the embodiments of this application is a battery cell, which refers to a smallest unit for storing and outputting electric energy.

The battery processing device according to the embodiments of this application refers to a device that is mainly configured for processing to obtain a battery.

Refer to FIG. 1. FIG. 1 is a schematic diagram of a battery processing device 1000 according to some embodiments of this application. The battery processing device 1000 according to these embodiments of this application includes a cleaning apparatus 100. The cleaning apparatus 100 is configured to clean surfaces of cells. The cleaning apparatus 100 refers to an apparatus capable of implementing a cleaning function. The cleaning apparatus 100 is for cleaning the surfaces of the cells, mainly for removing impurities on the surfaces of the cells.

In some embodiments, reference is still made to FIG. 1. The battery processing device 1000 may further include a stacking apparatus 200. The stacking apparatus 200 is configured to stack the cells cleaned by the cleaning apparatus 100 into a battery.

In view of this, during battery processing, the cells may be first taken out of a foam package and then transferred to the cleaning apparatus 100. The cleaning apparatus 100 is used to clean the surfaces of the cells to remove impurities on the surfaces of the cells. Subsequently, the cells cleaned by the cleaning apparatus 100 are transferred to an inspection position, a gluing position, and the like to be subjected to corresponding operations such as inspection and gluing. Finally, the cells are transferred to a stacking position, and the cleaned cells are stacked by the stacking apparatus 200 to form a battery.

In this way, before the cells are stacked to form the battery, the surfaces of the cells are cleaned by the cleaning apparatus 100, alleviating the problem that impurities are brought into the battery, thereby improving product quality of the battery.

In some embodiments, the battery processing device 1000 may further include an inspection apparatus. The inspection apparatus is configured to inspect the cells cleaned by the cleaning apparatus 100.

In some embodiments, the battery processing device 1000 may further include a gluing apparatus. The gluing apparatus is configured to glue the cells cleaned by the cleaning apparatus 100.

In some embodiments, still referring to FIG. 1, the battery processing device 1000 may further include a transfer apparatus 300. The transfer apparatus 300 is configured to transfer the cells. The transfer apparatus 300 can transfer the cells to the cleaning apparatus 100 for cleaning and can also transfer the cells cleaned by the cleaning apparatus 100 away from the cleaning apparatus 100. The transfer apparatus 300 may be but is not limited to a manipulator.

Figure 2:
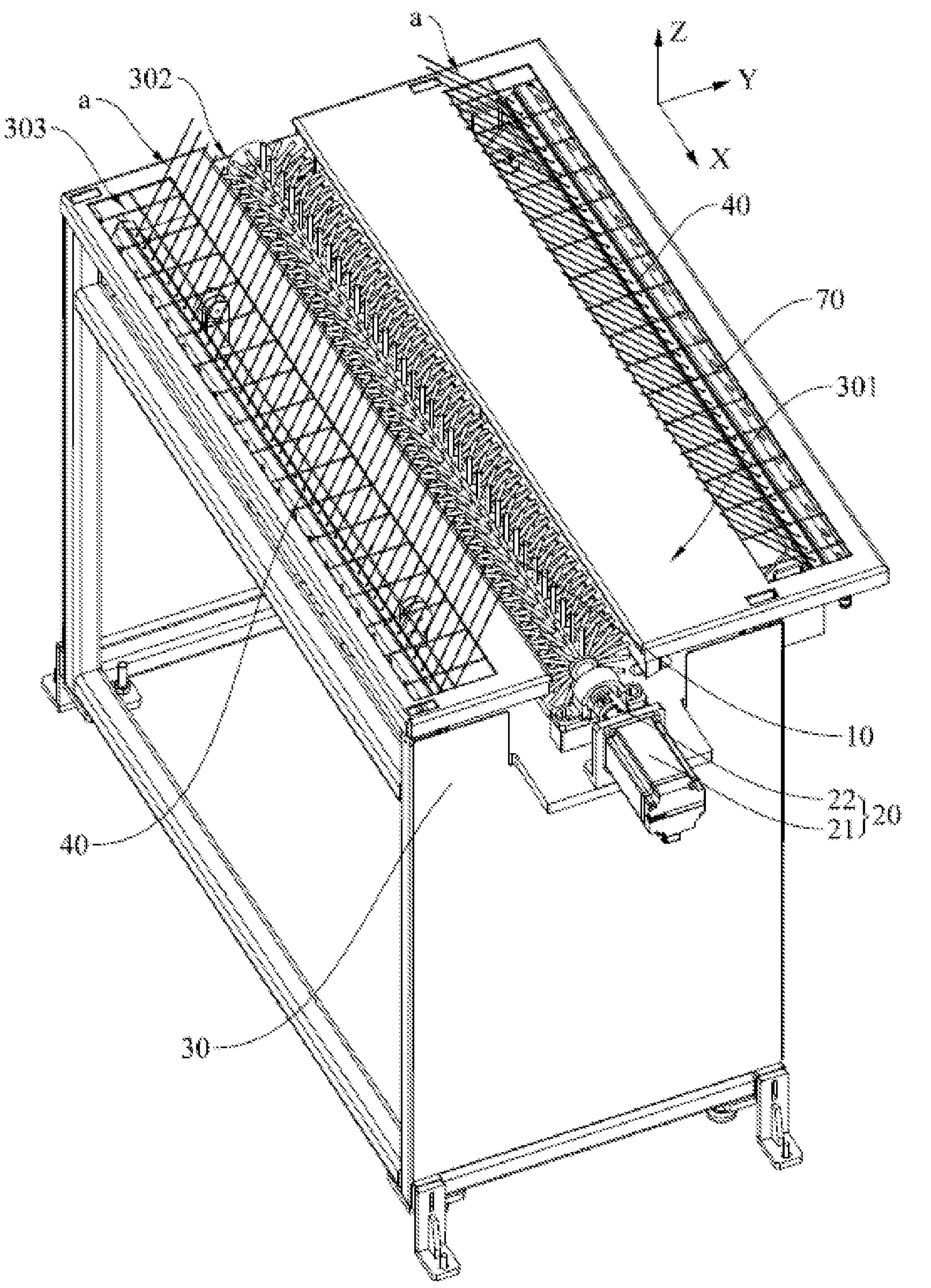
FIG. 2 is a partial three-dimensional structural diagram of a cleaning apparatus according to some embodiments of this application.
Figure 3:
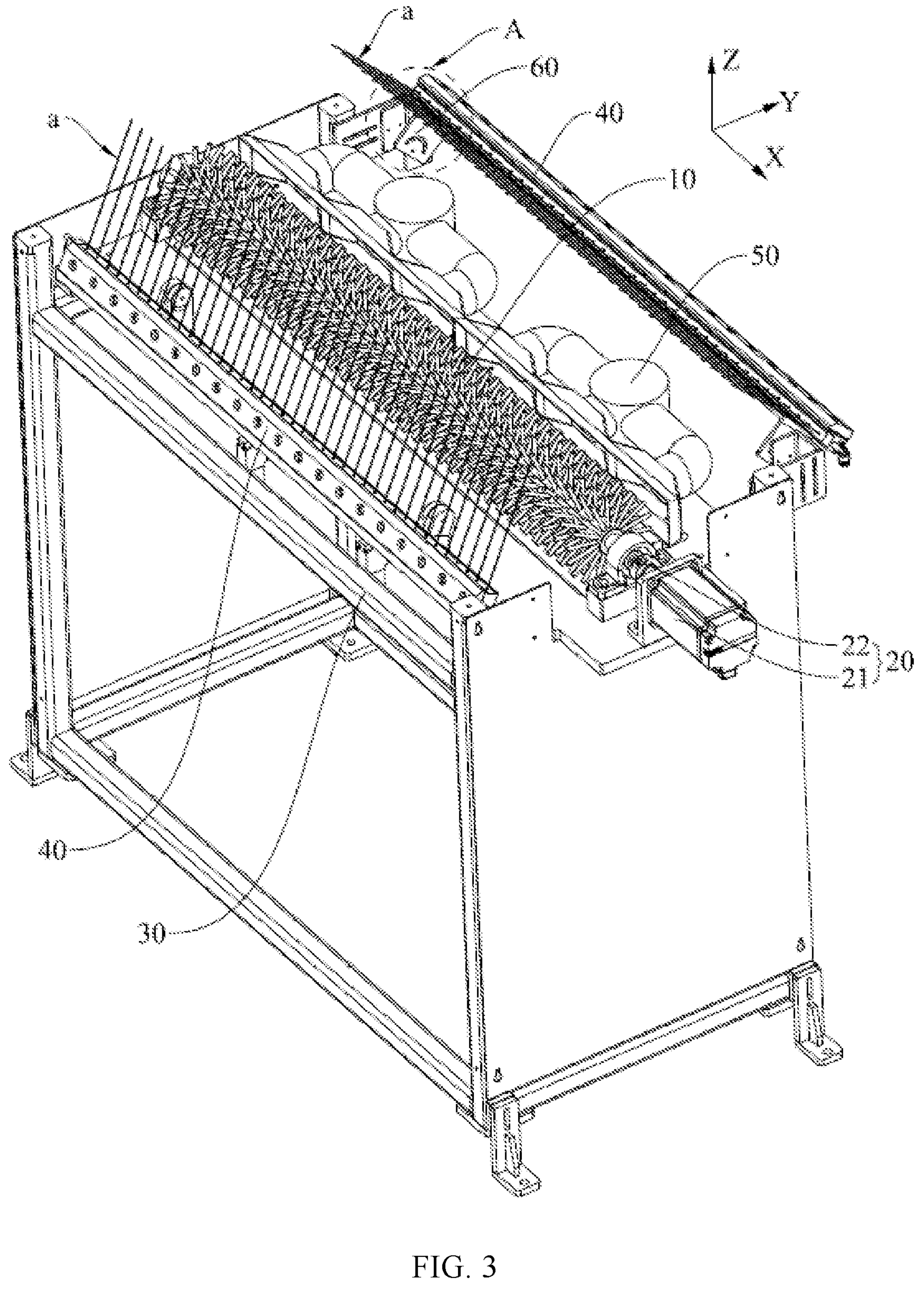
FIG. 3 is a partial structural diagram of the cleaning apparatus shown in FIG. 2.
Figure 4:
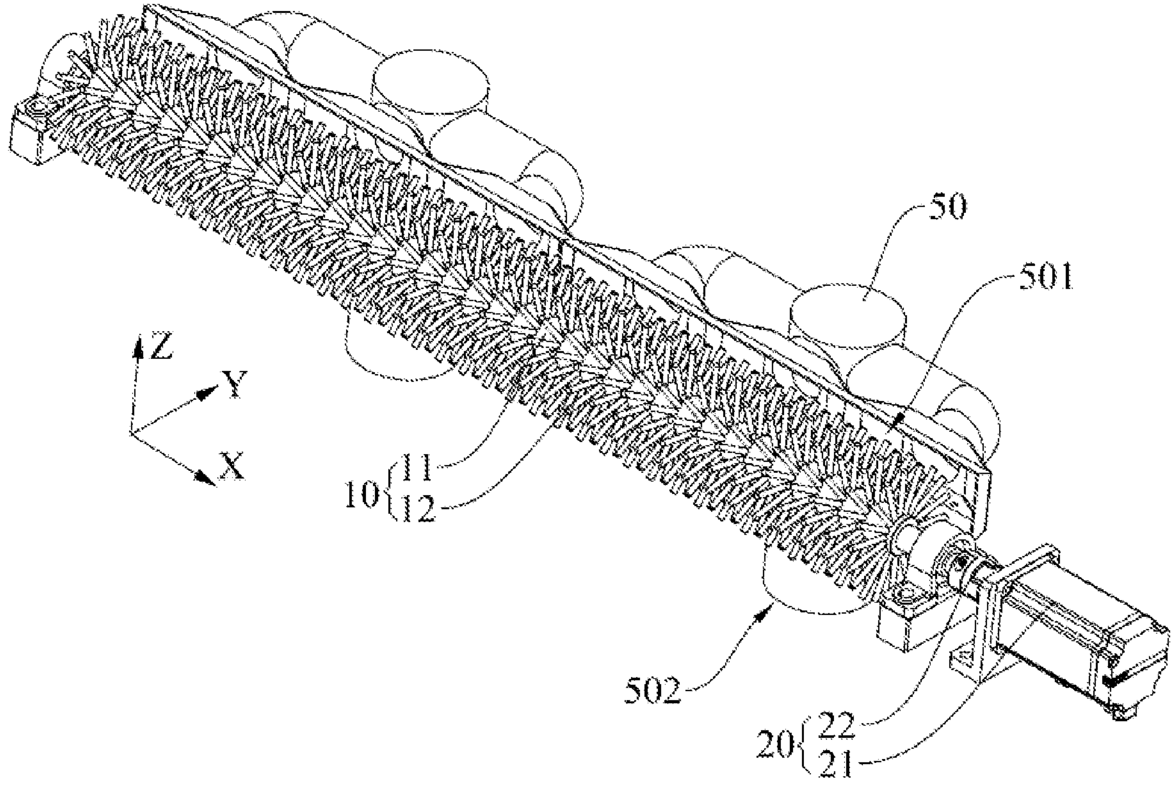
FIG. 4 is a schematic diagram showing fitting of a cleaning member, a driving mechanism, and a dust collection hood of the cleaning apparatus shown in FIG. 2.

In some embodiments, reference is made to FIG. 2 to FIG. 4 in conjunction with other figures. FIG. 2 is a partial three-dimensional structural diagram of a cleaning apparatus 100 according to some embodiments of this application; FIG. 3 is a partial three-dimensional structural diagram of the cleaning apparatus 100 shown in FIG. 2; and FIG. 4 is a schematic diagram showing fitting of a cleaning member 10, a driving mechanism 20, and a dust collection hood 50 of a cleaning apparatus 100 according to some embodiments of this application, the cleaning apparatus 100 includes a workbench 30, a cleaning member 10, and a driving mechanism 20. The cleaning member 10 is movably disposed at the workbench 30. The driving mechanism 20 is disposed at the workbench 30. The driving mechanism 20 is configured to drive the cleaning member 10 to move so as to allow the cleaning member 10 to perform a frictional motion relative to a surface of a cell.

The workbench 30 is a frame structure of the cleaning apparatus 100.

The driving mechanism 20 refers to a mechanism for driving the cleaning member 10 to move.

The cleaning member 10 refers to a component for cleaning the surface of the cell. In some embodiments, the cleaning member 10 may be a component such as a hairbrush or a feather duster that can perform a frictional motion relative to the cell to clean the surface of the cell.

While the cleaning apparatus 100 is cleaning the surface of the cell, the cleaning member 10 is in contact with the surface of the cell so that friction is generated between the surface of the cell and the cleaning member 10. In addition, the cleaning member 10 is driven by the driving mechanism 20 to move relative to the cell and the cleaning member 10 is in contact with the surface of the cell to generate friction all the time, such that the cleaning member 10 performs a frictional motion relative to the surface of the cell to remove impurities on the surface of the cell.

With the cleaning apparatus 100 according to these embodiments of this application, in a battery processing technique, the cleaning member can be driven by the driving mechanism to perform a frictional motion relative to the surface of the cell, such that the surface of the cell is cleaned and impurities on the surface of the cell are removed, alleviating the problem that the impurities are brought into the battery, thereby improving the product quality of the battery.

In addition, in a case that the cleaning apparatus 100 is cleaning the surface of the cell, the driving mechanism 20 can be controlled to be started so as to drive the cleaning member 10 to move, and the cell is transferred to the cleaning member 10, such that the cleaning member 10 cleans the surface of the cell. The cleaning operation of the cleaning apparatus 100 for the surface of the cell is quite simple and easy to implement.

In some embodiments, the cleaning apparatus 100 is mainly for removing impurities at the bottom of the cell. Specifically, during battery processing, the cell can be transferred to a position above the cleaning apparatus 100, allowing the cleaning apparatus 100 to clean the bottom of the cell. The bottom of the cell herein refers to the bottom of the cell during transfer. For example, during transfer, a height direction of the cell is parallel to a vertical direction, and the bottom of the cell is an end of the cell along the height direction. In an example, as shown in FIG. 2, the cleaning apparatus 100 is configured to clean a surface of one side of the cell in a direction Z. Certainly, in other embodiments, during transfer of the cell, in a case that the cell can be turned over or subjected to other operations, surfaces of other side portions of the cell may also be cleaned by the cleaning apparatus 100, as long as the to-be-cleaned surfaces of the cell are turned over to positions opposite the cleaning apparatus 100, so as to allow the cleaning apparatus 100 to clean the surfaces of the cell.

It should be noted herein that in the process of processing the cells into a battery, typically the cells are subjected to plasma cleaning. However, only some of the surfaces of the cell are cleaned, and not all the surfaces of the cell are entirely cleaned. With the cleaning apparatus 100 provided, the surfaces of the cell that cannot be cleaned in the processing technique can be cleaned via the cleaning member 10, thereby alleviating the problem that impurities are brought into the battery.

In some embodiments, reference is still made to FIG. 2 in conjunction with other figures. The cleaning member 10 is rotatably disposed at the workbench 30, to be rotatable relative to the cell.

The driving mechanism 20 is configured to drive the cleaning member 10 to rotate.

While the cleaning apparatus 100 is cleaning the surface of the cell, the cleaning member 10 is in contact with the surface of the cell so that friction is generated between the surface of the cell and the cleaning member 10. In addition, the cleaning member 10 can rotate about its central axis under the driving of the driving mechanism 20, so as to rotate relative to the cell. While the cleaning member 10 is rotating about its central axis, the cleaning member 10 is in contact with the surface of the cell to generate friction all the time, such that the cleaning member 10 performs a frictional motion relative to the surface of the cell while rotating to remove impurities on the surface of the cell.

In an example, as shown in FIG. 2, in a case that a surface of one side of the cell in a direction Z in the figure needs to be cleaned, the central axis of the cleaning member 10 intersects with the direction Z. For example, the central axis of the cleaning member 10 may be parallel to a direction X shown in the figure, such that when the cleaning member 10 rotates about its central axis, a peripheral side of the cleaning member 10 around its central axis may be in contact with a to-be-cleaned surface of the cell all the time. Thus, the cleaning member 10 can be kept in contact with the cell all the time while rotating, that is, the cleaning member 10 can perform a frictional motion relative to the surface of the cell to clean the to-be-cleaned surface of the cell. In other examples, the central axis of the cleaning member 10 may be parallel to a direction Y shown in the figure or parallel to a direction intersecting with all of the direction Z, the direction X, and the direction Y.

Two directions intersecting with each other means that the two directions are not parallel to each other, to be specific, the two directions form an included angle greater than 0° and less than 180°. The two directions may be perpendicular to each other or not perpendicular to each other. The two directions may be intersected directions located on a same plane or directions respectively located in different planes, and a projection of one direction on the plane where the other direction is located may intersect with one of the directions.

The direction Z, the direction X, and the direction Y are directions in which three axes of a spatial coordinate system are located. The direction Z is perpendicular to the direction Y, the direction X is perpendicular to the direction Z, and the direction X is perpendicular to the direction Y.

The driving mechanism 20 may be a motor. Alternatively, as shown in FIG. 2 to FIG. 4, the driving mechanism 20 may include a motor 21 and a shaft coupler 22. The shaft coupler 22 is connected to an output end of the motor 21 and the cleaning member 10 and can drive the cleaning member 10 to rotate under the driving of the motor 21. Alternatively, the driving mechanism 20 may include a combination mechanism in which a motor cooperates with a gear set. Specifically, the gear set includes a plurality of gears meshed with each other in sequence. One gear is connected to an output shaft of the motor, and another gear is connected to the cleaning member 10. When the motor is started, a driving force of the motor can be sequentially transmitted to the cleaning member 10 via the plurality of gears of the gear set. Certainly, there are various types of driving mechanisms 20, which may be specifically selected according to actual use situations.

With such an arrangement, the cleaning member 10 can perform a frictional motion relative to the surface of the cell to remove impurities on the surface of the cell.

For ease of description, in the following embodiments of this application, the cleaning apparatus 100 being configured to clean a surface of one side of the cell in the direction Z is used as an example for description.

The direction Y is parallel to a first direction Y mentioned hereinafter. For ease of description, the direction Z may be configured as a second direction Z, and the direction X may be configured as a third direction X.

In some embodiments, the cleaning member 10 is movably disposed at the workbench to be movable relative to the cell.

The driving mechanism 20 is configured to drive the cleaning member 10 to move, for example, may be a linear air cylinder or linear electric cylinder, and may be a combination mechanism in which a motor cooperates with a screw mechanism, or the like.

While the cleaning apparatus 100 is cleaning the surface of the cell, the cleaning member 10 comes into contact with the surface of the cell, such that the surface of the cell is in contact with the cleaning member 10 to generate friction. In addition, the cleaning member 10 can be driven by the driving mechanism 20 to move relative to the cell and the cleaning member 10 is in contact with the surface of the cell to generate friction all the time while moving relative to the cell, such that the cleaning member 10 performs a frictional motion relative to the surface of the cell while moving to remove impurities on the surface of the cell.

In an example, in a case that a surface of one side of the cell in a second direction Z needs to be cleaned, a moving direction of the cleaning member 10 is perpendicular to the second direction Z. For example, the cleaning member 10 can move relative to the cell along a third direction X, move relative to the cell along a first direction Y, or move along a direction intersecting with the first direction Y and the third direction X. In this way, while the cleaning member 10 is moving relative to the cell, the cleaning member 10 can be kept in contact with the surface of the cell all the time, such that the cleaning member 10 can perform a frictional motion relative to the surface of the cell to remove impurities on the surface of the cell.

With such an arrangement, the cleaning member 10 can perform a frictional motion relative to the surface of the cell to remove impurities on the surface of the cell.

It can be understood that in some embodiments, the driving mechanism 20 can drive the cleaning member 10 to rotate and move simultaneously, allowing the cleaning member 10 to move flexibly to clean the surface of the cell.

In some embodiments, reference is made to FIG. 2 to FIG. 4 in conjunction with other figures. The cleaning member 10 includes a roll shaft 11 and a plurality of elastic strips 12. The roll shaft 11 is connected to an output end of the driving mechanism 20. The plurality of elastic strips 12 are spaced apart on the roll shaft 11. The elastic strips 12 are configured to come into elastic contact with the surface of the cell to clean the surface of the cell.

The roll shaft 11 refers to a shaft-like structure that is mainly configured to assemble the elastic strips 12.

The elastic strips 12 refer to elastic strip-shaped structures. The elastic strips 12 may be strip-shaped structures with certain elasticity, such as rubber strips, silicone strips, or plastic strips. One end of the elastic strip 12 is disposed on the roll shaft 11 and the other end is configured to come into contact with the surface of the cell so as to clean the surface of the cell.

The roll shaft 11 is connected to the output end of the driving mechanism 20, so that the driving mechanism 20 drives the roll shaft 11 to move. The driving mechanism 20 may drive the roll shaft 11 to rotate, so as to allow the roll shaft 11 and the elastic strips 12 on the roll shaft 11 to rotate together and allow the elastic strips 12 to perform a frictional motion relative to the surface of the cell. The driving mechanism 20 may drive the roll shaft 11 to move, so as to allow the roll shaft 11 and the elastic strips 12 on the roll shaft 11 to move together and allow the elastic strips 12 to perform a frictional motion relative to the surface of the cell.

In view of this, in a case that the cleaning apparatus 100 is cleaning the surface of the cell, one end of the elastic strip 12 far away from the roll shaft 11 is in contact with the surface of the cell so as to generate friction with the surface of the cell. The roll shaft 11 is driven by the driving mechanism 20 to move relative to the cell, so as to allow the elastic strips 12 to perform a frictional motion relative to the surface of the cell, such that the elastic strips 12 remove impurities on the surface of the cell. In this way, based on the elasticity of the elastic strips 12, in a case that the elastic strips 12 move relative to the cell, the elastic strips 12 can undergo elastic deformation relative to the surface of the cell. This allows the elastic strips 12 to smoothly move relative to the cell, making the elastic strips 12 be in contact with the surface of the cell all the time to perform a frictional motion relative to the surface of the cell. As a result, the elastic strips 12 can clean the surface of the cell. In addition, based on the elasticity of the elastic strips 12, the elastic strips 12 have a specified structural strength and are therefore enabled to provide a force capable of removing impurities on the surface of the cell, thereby smoothly cleaning the surface of the cell.

With such an arrangement, the cleaning member 10 can smoothly perform a frictional motion relative to the cell, and the cleaning member 10 can provide a strong force capable of removing the impurities on the surface of the cell, so that the cleaning member 10 can better clean the surface of the cell.

In some embodiments, reference is made to FIG. 2 to FIG. 4 in conjunction with other figures. The cleaning member 10 is partially disposed inside the workbench 30, and the cleaning member 10 at least partially exceeds a surface of the workbench 30.

As shown in FIG. 2, the cleaning member 10 is partially disposed inside the workbench 30, the workbench 30 has a bench surface 301 on one side in the second direction Z, and the bench surface 301 is configured to face the cell in the second direction Z. The bench surface 301 is provided with a cleaning window 302. The cleaning member 10 is at least partially disposed at the cleaning window 302 and exceeds the bench surface 301 along the second direction Z via the cleaning window 302. In this way, when the cell is located on a side, having the bench surface 301, of the workbench 30, a portion of the cleaning member 10 exceeding the bench surface 301 along the second direction Z can come into contact with the cell and perform a frictional motion relative to the cell, allowing the cleaning member 10 to clean the surface of the cell.

With such an arrangement, it is convenient for the cleaning member 10 to come into contact with the surface of the cell and generate friction with the surface of the cell, thereby allowing the cleaning member 10 to conveniently clean the surface of the cell. In addition, the cleaning member 10 is partially disposed inside the workbench 30, alleviating the problem of splashing of the impurities removed by the cleaning member 10, thereby achieving an effect of cleaning a battery processing environment.

In some embodiments, the transfer apparatus 300 may transfer the cell, so that the cell moves relative to the cleaning apparatus 100. Thus, the cell moves relative to the cleaning member 10 of the cleaning apparatus 100, allowing the surface of the cell to be in frictional motion relative to the cleaning member 10. As a result, the cleaning member 10 cleans the surface of the cell.

In an example, in a case that a surface of one side of the cell in the second direction Z in the figure needs to be cleaned, a direction in which the transfer apparatus 300 drives the cell to move is perpendicular to the second direction Z. For example, the transfer apparatus 300 may drive the cell to move relative to the cleaning member 10 along the first direction Y, drive the cell to move relative to the cleaning member 10 along the third direction X, or drive the cell to move along a direction intersecting with both the third direction X and the first direction Y In this way, while the cell is moving relative to the cleaning member 10, the cleaning member 10 can be kept in contact with the surface of the cell all the time, such that the cleaning member 10 can perform a frictional motion relative to the surface of the cell to remove impurities on the surface of the cell.

The transfer apparatus 300 is configured to transfer and move the cell, and when the cleaning member 10 can rotate relative to the cell, a rotating direction of the cleaning member 10 at a position in contact with the surface of the cell needs to be opposite to the moving direction of the cell. When the rotating direction of the cleaning member 10 at a position in contact with the surface of the cell is the same as the moving direction of the cell, a linear rotating speed of the cleaning member 10 needs to be different from a moving speed of the cell. The transfer apparatus 300 is configured to transfer and move the cell, and when the cleaning member 10 can move relative to the cell, the moving direction of the cleaning member 10 needs to be opposite to the moving direction of the cell. When the moving direction of the cleaning member 10 is the same as the moving direction of the cell, a moving speed of the cleaning member 10 needs to be different from a moving speed of the cell.

In an example, the transfer apparatus 300 is configured to drive the cell to move along the first direction Y, and the cleaning member 10 is configured to be rotatable. In addition, the rotating direction of the cleaning member 10 at a position in contact with the surface of the cell is opposite to the moving direction of the cell. This allows the cleaning member 10 to clean a surface of one side of the cell facing the cleaning member 10 in the second direction Z.

While the cleaning apparatus 100 is cleaning the surface of the cell, the transfer apparatus 300 transfers the cell to one side of the cleaning member 10 in the second direction Z. Moreover, the transfer apparatus 300 drives the cell to move along the first direction Y In this case, the cleaning member 10 rotates about its central axis, the central axis of the cleaning member 10 is parallel to the second direction Z, and the rotating direction of the cleaning member 10 at the position in contact with the surface of the cell is opposite to the moving direction of the cell. This allows the cleaning member 10 to clean a surface of one side of the cell facing the cleaning member 10 in the second direction Z.

With such an arrangement, it is convenient for the cleaning member 10 to clean the surface of the cell, allowing for convenient removal of the impurities on the surface of the cell and alleviating the problem that the impurities are brought into the battery.

In some embodiments, reference is made to FIG. 3 and FIG. 4 in conjunction with other figures. The cleaning apparatus 100 further includes a dust collection hood 50 disposed at the workbench 30. The dust collection hood 50 is disposed opposite the cleaning member 10 to receive the impurities removed by the cleaning member 10.

The dust collection hood 50 refers to a hood structure for receiving impurities. Specifically, the dust collection hood 50 includes a dust inlet 501. The dust collection hood 50 being disposed opposite the cleaning member 10 means that the dust inlet 501 of the dust collection hood 50 faces the cleaning member 10.

In view of this, while the cleaning apparatus 100 is cleaning the surface of the cell, the cleaning member 10 removes the impurities on the surface of the cell, and the dust collection hood 50 receives the impurities removed by the cleaning member 10, thereby alleviating the problem that the impurities removed by the cleaning member 10 are scattered in various positions.

In an example, as shown in FIG. 3 and FIG. 4, the dust collection hoods 50 are disposed at one side of the cleaning member 10 in the first direction Y In other examples, the dust collection hoods 50 may be separately disposed on two opposite sides of the cleaning member 10 in the first direction Y, on one side of the cleaning member 10 far away from the cell in the second direction Z, on one side or two sides of the cleaning member 10 in the third direction X, or even on one side or two sides of the cleaning member 10 intersecting with the first direction Y, the second direction Z, and the third direction X.

With such an arrangement, the dust collection hoods 50 can receive the impurities removed from the surface of the cell by the cleaning member 10, allowing the cleaning apparatus 100 to achieve an effect of cleaning the entire operating environment and also alleviating the problem that the cleaning effect of the cleaning member 10 is affected due to the impurities remaining on the cleaning member 10.

In some embodiments, the cleaning apparatus 100 further includes a dust sucking apparatus. The dust sucking apparatus is connected to the dust collection hood 50 to suck out impurities removed by the cleaning member 10.

The dust sucking apparatus refers to an apparatus having a suction force for sucking impurities out of the dust collection hood 50. For example, the dust sucking apparatus may be an apparatus having a suction force, such as a dust collector, an exhaust fan, or an air pump.

Understandably, the dust collection hood 50 further includes a dust outlet 502. The dust inlet 501 and dust outlet 502 of the dust collection hood 50 are in communication with each other. In addition, the dust sucking apparatus is connected to the dust outlet 502 of the dust collection hood 50.

In view of this, while the cleaning apparatus 100 is cleaning the surface of the cell, the dust sucking apparatus is started to suck dust, such that impurities removed from the surface of the cell by the cleaning member 10 are sucked out of the cleaning member 10 under the dust collection effect of the dust sucking apparatus sequentially through the dust inlet 501 and dust outlet 502 of the dust collection hood 50. In this way, the impurities removed from the surface of the cell by the cleaning member 10 do not affect the effect of cleaning the entire operating environment and do not affect the cleaning effect of the cleaning member 10 as well.

In some embodiments, reference is made to FIG. 2 to FIG. 4 in conjunction with other figures. The cleaning apparatus 100 further includes an ion air knife 40 disposed at the workbench 30. The ion air knife 40 is spaced apart from the cleaning member 10, and the ion air knife 40 is configured to exhaust air toward the cell.

The ion air knife 40 refers to a device for blowing out ion air to eliminate static electricity.

With the ion air knife 40 provided, while the cleaning apparatus 100 is removing impurities on the surface of the cell, the ion air knife 40 can exhaust air toward the surface of the cell so as to eliminate static electricity on the surface of the cell. In this way, the surface of the cell is less likely to adsorb impurities, thereby alleviating the problem that impurities are adsorbed onto the surface of the cell and are consequently brought into the battery.

In some embodiments, reference is made to FIG. 2 to FIG. 4 in conjunction with other figures. The cleaning member 10 and the ion air knife 40 are spaced apart from each other in the first direction Y The ion air knife 40 includes an air outlet 401. The air outlet 401 faces the cleaning member 10 in a direction oblique to the first direction Y and is configured for exhausting air toward the cell.

While the ion air knife 40 is blowing out ion air, the ion air is blown out of the air outlet 401.

While the cleaning apparatus 100 is cleaning the cell, the cell is disposed on one side of the cleaning member 10 in the second direction Z, allowing one side of the cell facing the cleaning member 10 in the second direction Z to be cleaned. The air outlet 401 of the ion air knife 40 faces the cleaning member 10 in a direction oblique to the first direction Y and is configured for exhausting air toward the cell. In view of this, it can be understood that the air outlet 401 faces the cell along a direction intersecting with the first direction Y and the second direction Z, that is, the ion air knife 40 can exhaust air toward the cell along the direction intersecting with the first direction Y and the second direction Z, for example, a direction a shown in FIG. 2 and FIG. 3. Such an arrangement allows the ion air knife 40 to blow out ion air toward a surface of one side of the cell facing the cleaning member 10 in the second direction Z so as to eliminate static electricity on the surface of the side of the cell facing the cleaning member 10 in the second direction Z. In addition, the ion air knife 40 may further blow out ion air toward a side surface of the cell in the first direction Y so as to eliminate static electricity on the side surface of the cell in the first direction Y.

With such an arrangement, the ion air knife 40 can blow out ion air toward a plurality of surfaces of the cell so as to eliminate static electricity on the plurality of surfaces of the cell, thereby alleviating the problem that impurities are adsorbed onto the surfaces of the cell.

Understandably, the provision of the transfer apparatus 300 allows the cell to move relative to the cleaning member 10 along the first direction Y With such an arrangement, the cell can move relative to the cleaning member 10 along the first direction Y, such that a surface of one side of the cell facing the cleaning member 10 in the second direction Z is in frictional motion relative to the cleaning member 10, allowing the cleaning member 10 to clean the surface of the side of the cell facing the cleaning member 10 in the second direction Z, thereby helping to implement the cleaning operation in step S20. Moreover, the cell moving along the first direction Y allows the cell to move until it faces the ion air knife 40 in the second direction Z. In this way, the ion air knife 40 can blow out ion air toward one side of the cell facing the cleaning member 10 in the second direction Z so as to eliminate static electricity on the surface of the side of the cell facing the cleaning member 10 in the second direction Z. In addition, the cell may alternatively move until it is misaligned to the ion air knife 40. At this moment, the ion air knife 40 can blow out ion air toward a side surface of the cell in the first direction Y so as to eliminate static electricity on the side surface of the cell in the first direction Y With such an arrangement, static electricity on a plurality of surfaces of the cell are eliminated.

In some embodiments, reference is made to FIG. 2 and FIG. 3 in conjunction with other figures. The cleaning member 10 and the ion air knife 40 are spaced apart from each other in the first direction Y, and two opposite sides of the cleaning member 10 in the first direction Y each are provided with the ion air knife 40.

Understandably, two groups of ion air knives 40 are provided. The two groups of ion air knives 40 are separately disposed on the two opposite sides of the cleaning member 10 in the first direction Y Each group of ion air knives 40 may include at least one ion air knife 40.

With such an arrangement, the ion air knives 40 on the two opposite sides of the cleaning member 10 in the first direction Y can both exhaust air toward the cell, thereby jointly eliminating static electricity on surfaces of two opposite sides of the cell in the first direction Y.

In some embodiments, the transfer apparatus 300 may be configured to transfer the cell. Specifically, the transfer apparatus 300 may transfer the cell to make the cell move along the first direction Y.

In view of this, while the cleaning apparatus 100 is cleaning the cell, the transfer apparatus 300 may first transfer the cell to one side of a first ion air knife 40 in the second direction Z so that a surface of one side of the cell facing the first ion air knife 40 in the second direction Z faces this ion air knife 40. At this moment, the first ion air knife 40 blows out ion air toward the surface of the side of the cell facing the first ion air knife 40 in the second direction Z so as to eliminate static electricity on the surface of the side of the cell facing the first ion air knife in the second direction Z The cell is located on a same side of the ion air knife 40 and the cleaning member 10 in the second direction Z, that is, the surface of the side of the cell facing the ion air knife 40 in the second direction Z and the surface of the side of the cell facing the cleaning member 10 in the second direction Z are the same surface. Subsequently, the transfer apparatus 300 transfers the cell to make the cell move along the first direction Y, allowing the cell to move toward the cleaning member 10 along the first direction Y such that the cell is gradually misaligned to the first ion air knife 40. In this case, the first ion air knife 40 continuously blows out ion air toward one side of the cell in the first direction Y so as to eliminate static electricity on the surface of the side of the cell in the first direction Y A second ion air knife 40 blows out ion air toward the other side of the cell in the first direction Y so as to eliminate static electricity on the surface of the other side of the cell in the first direction Y In addition, the frictional motion of the cell relative to the cleaning member 10 allows the cleaning member 10 to remove impurities on a surface of one side of the cell facing the cleaning member 10 in the second direction Z. Finally, the transfer apparatus 300 transfers the cell to make the cell move along the first direction Y to one side of the second ion air knife 40 in the second direction Z, and the second ion air knife 40 blows out ion air toward one side of the cell facing the first ion air knife 40 in the second direction Z so as to eliminate static electricity on the surface of the side of the cell facing the first ion air knife 40 in the second direction Z. With such an arrangement, static electricity on the surface of the cell can be better eliminated, thereby alleviating the problem that impurities are adsorbed onto the surface of the cell and are consequently brought into the battery.

Certainly, according to actual use requirements, if the static electricity on the surface of the side of the cell facing the cleaning member 10 in the second direction Z performs not need to be eliminated, the cell may not need to be transferred to face the ion air knife 40 in the second direction Z, and the cell can be directly transferred to two opposite sides of the cleaning member 10 in the first direction Y and between two ion air knives 40. At this moment, the cleaning member 10 cleans the surface of the side of the cell facing the cleaning member 10 in the second direction Z, and the ion air knives 40 on the two opposite sides of the cleaning member 10 are configured to respectively blow out ion air toward the two opposite sides of the cell in the first direction Y so as to eliminate static electricity on surfaces of the two opposite sides of the cell in the first direction.

Figure 5:
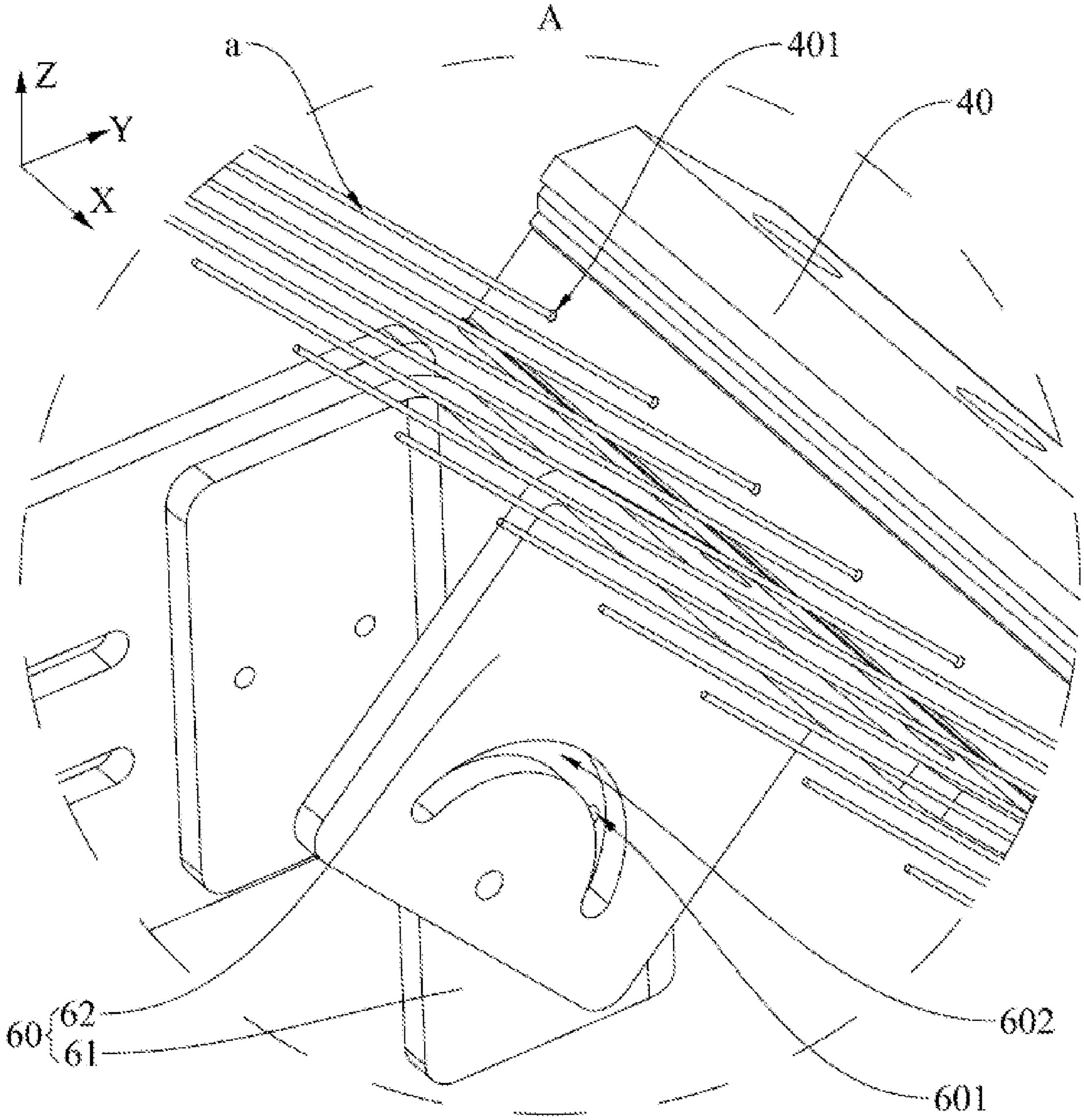
FIG. 5 is an enlarged view of position Ain FIG. 3.

In some embodiments, reference is made to FIG. 2 to FIG. 5 in conjunction with other figures. FIG. 5 is a locally enlarged view of FIG. 3. The ion air knife 40 includes an air outlet 401. The ion air knife 40 is rotatably disposed at the workbench 30 to adjust orientation of the air outlet 401 during rotation.

Specifically, the ion air knife 40 is rotatably connected to the workbench 30.

The air outlet 401 of the ion air knife 40 faces the cell. The ion air knife 40 can adjust orientation of the air outlet 401 during rotation.

With such an arrangement, the ion air knife 40 is rotatable to adjust the orientation of the air outlet 401, allowing the ion air knife 40 to conveniently exhaust air toward the cell via the air outlet 401 so as to eliminate static electricity on the surface of the cell.

In an example, as shown in FIG. 2 and FIG. 3, the ion air knife 40 is configured to rotate about its central axis. A rotating axis of the ion air knife 40 is parallel to the third direction X.

In some embodiments, reference is made to FIG. 3 and FIG. 5 in conjunction with other figures. The cleaning apparatus 100 further includes a rotating structure 60. The rotating structure 60 includes a fixed arm 61 and a rotating arm 62. The fixed arm 61 is disposed at the workbench 30, the rotating arm 62 is rotatably connected to the fixed arm 61, and the ion air knife 40 is disposed on the rotating arm 62.

The fixed arm 61 refers to a component configured to connect the workbench 30 and the rotating arm 62. The rotating arm 62 refers to a component connected to the fixed arm 61 and the ion air knife 40 and rotatable relative to the fixed arm 61.

With the fixed arm 61 and rotating arm 62 provided, the rotating arm 62 is rotatable relative to the fixed arm 61, so that the ion air knife 40 disposed on the rotating arm 62 is rotatable relative to the workbench 30, and thus the orientation of the air outlet 401 of the ion air knife 40 can be adjusted, allowing the ion air blown out by the ion air knife 40 to eliminate static electricity on the surface of the cell.

In some embodiments, reference is made to FIG. 3 and FIG. 5 in conjunction with other figures. The fixed arm 61 is provided with a first fixing hole 601, and the rotating arm 62 is provided with a second fixing hole 602 opposite the first fixing hole 601. The first fixing hole 601 and the second fixing hole 602 are both spaced apart from the rotating axis of the rotating arm 62; and the first fixing hole 601 and the second fixing hole 602 are configured for fixation using a fastener.

In some possible designs, the first fixing hole 601 is arc-shaped. In some possible designs, the second fixing hole 602 is arc-shaped. In some possible designs, the first fixing hole 601 and the second fixing hole 602 are both arc-shaped. Understandably, the first fixing hole 601 and/or the second fixing hole 602 are arc-shaped, so that while the rotating arm 62 is rotating relative to the fixed arm 61, the second fixing hole 602 on the rotating arm 62 can be kept opposite the first fixing hole 601. In this way, after the rotating arm 62 has rotated to an appropriate position, the fastener can sequentially pass through the first fixing hole 601 and second fixing hole 602 opposite each other to fix the fixed arm 61 and the rotating arm 62, thereby limiting the ion air knife 40 on the workbench 30. Correspondingly, the fastener may be loosened to allow the rotating arm 62 to drive the ion air knife 40 to rotate, thereby adjusting the orientation of the air outlet 401 of the ion air knife 40.

The fastener may be a component having a fastening function, such as a bolt or a screw.

With such an arrangement, angle adjustment and position limitation of the ion air knife 40 can be implemented, providing great convenience in operation.

In some embodiments, reference is made to FIG. 2 in conjunction with other figures. The workbench 30 is provided with an air outlet window 303. The air outlet window 303 is configured for the ion air knife 40 to exhaust air. The air outlet window 303 is provided with a protective net 70.

Understandably, the workbench 30 has a bench surface 301 on one side in the second direction Z, and the bench surface 301 is configured to face the cell in the second direction Z. The bench surface 301 of the workbench 30 is provided with the air outlet window 303, and the air outlet 401 of the ion air knife 40 faces the air outlet window 303. In view of this, when the ion air knife 40 blows out ion air via the air outlet 401, the ion air is blown to the outside of the bench surface 301 via the air outlet window 303 so as to be blown to the cell.

The protective net 70 refers to a net-like structure having a protection function.

The air outlet window 303 being provided with the protective net 70 can alleviate the problem that an operator accidentally comes into contact with the ion air knife 40 and accordingly alleviates the problem of injuries to the operator caused by accidental contact with the ion air knife 40, thereby improving the safety performance of the cleaning apparatus 100.

In some embodiments, the cleaning apparatus 100 further includes an ion fan. An air outlet end of the ion fan is connected to the ion air knife 40.

The ion fan refers to a device for blowing out ion air. The ion fan is connected to the ion air knife 40. In view of this, the ion air blown out of the ion fan may be blown out by the ion air knife 40 so as to be blown to the cell, thereby eliminating static electricity on the surface of the cell.

With such an arrangement, static electricity on the surface of the cell can be eliminated via the ion air blown out of the ion fan.

Based on the foregoing concept, an embodiment of this application further provides a battery processing device 1000. The battery processing device 1000 includes a cleaning apparatus 100. The cleaning apparatus 100 in this embodiment is the same as the cleaning apparatus 100 in the foregoing embodiment, which specifically refers to related description of the cleaning apparatus 100 in the foregoing embodiment and is not elaborated herein.

The battery processing device 1000 according to this embodiment of this application is configured to include the cleaning apparatus 100 for cleaning a surface of a cell. Thus, in a battery processing technique, the surface of the cell can be cleaned by the cleaning apparatus 100 such that impurities on the surface of the cell are removed, alleviating the problem that the impurities are brought into the battery, thereby improving product quality of the battery.

Figure 6:
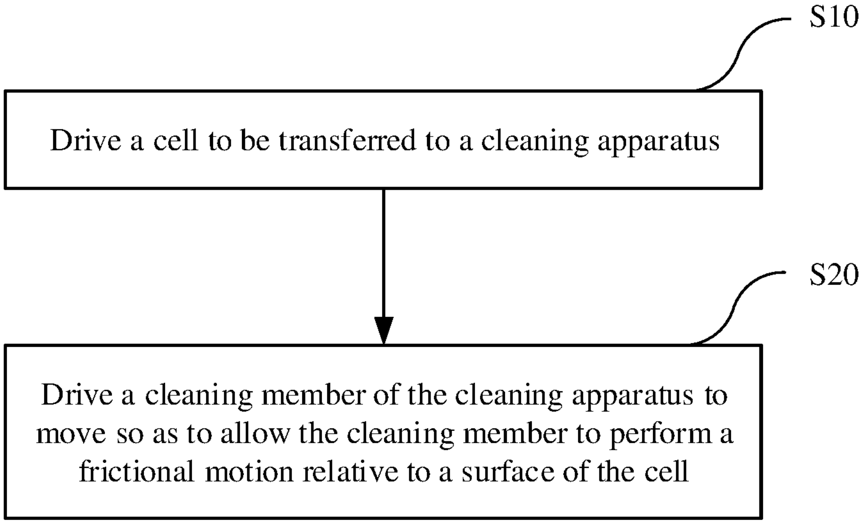
FIG. 6 is a flowchart of a battery processing method according to some embodiments of this application.

Based on the foregoing concept, reference is made to FIG. 6 in conjunction with other figures. FIG. 6 is a flowchart of a battery processing method according to some embodiments of this application. An embodiment of this application further provides a battery processing method. The battery processing method uses a battery processing device 1000. The battery processing device 1000 in this embodiment is the same as the battery processing device 1000 in the foregoing embodiment, which specifically refers to related description of the battery processing device 1000 in the foregoing embodiment and is not elaborated herein.

In this embodiment, the battery processing method includes the following steps.

S10. Drive a cell to be transferred to a cleaning apparatus 100.

A transfer apparatus 300 can be controlled to transfer the cell to the cleaning apparatus 100. Specifically, the transfer apparatus 300 transfers the cell to one side of a cleaning member 10 of the cleaning apparatus 100 in a second direction Z so as to allow one side of the cell in the second direction Z to face the cleaning member 10, thereby allowing the cleaning member 10 to conveniently clean a surface of one side of the cell facing the cleaning member 10 in the second direction Z.

S20. Drive the cleaning member 10 of the cleaning apparatus 100 to move so as to allow the cleaning member 10 to perform a frictional motion relative to the surface of the cell.

The cleaning member 10 can be driven to move by a driving mechanism 20 of the cleaning apparatus 100, so that the cleaning member 10 performs a frictional motion relative to the surface of the cell to remove impurities on the surface of the cell. In an example, as shown in the figure, the driving mechanism 20 may drive a roll shaft 11 of the cleaning member 10 to rotate so as to allow elastic strips 12 on the roll shaft 11 to rotate under the driving of the roll shaft 11, such that the elastic strips perform a frictional motion relative to the surface of the cell to clean the surface of the cell. In an example, the driving mechanism 20 may alternatively drive the cleaning member 10 to move so as to allow the cleaning member 10 to perform a frictional motion relative to the surface of the cell. In addition, the transfer apparatus 300 may be used to transfer and move the cell, allowing the cell to be in frictional motion relative to the cleaning member 10.

According to the battery processing method provided in this embodiment of this application, impurities on the surface of the cell can be removed using the battery processing device 1000 mentioned in the foregoing embodiments, alleviating the problem that the impurities are brought into the battery, thereby improving product quality of the battery.

In some embodiments, after driving the cleaning apparatus 100 to clean the surface of the cell, the battery processing method may further include the following step.

S30. Drive a stacking apparatus 200 to stack cells cleaned by the cleaning apparatus 100.

With such an arrangement, the cells cleaned by the cleaning apparatus 100 can be stacked to form a battery, thereby alleviating the problem that impurities are brought into the battery.

In some embodiments, the battery processing method further includes the following step.

S40. Drive an ion air knife 40 of the cleaning apparatus 100 to exhaust air toward the cell.

Step S40 and step S20 may be performed simultaneously, that is, while the cleaning member 10 of the cleaning apparatus 100 is cleaning the surface of the cell, the ion air knife 40 blows out ion air toward the cell to eliminate static electricity on the surface of the cell. Step S40 may alternatively be performed before or after step S20.

With such an arrangement, static electricity on the surface of the cell can be eliminated, such that the surface of the cell is less likely to adsorb impurities, thereby alleviating the problem that impurities are adsorbed onto the surface of the cell and are consequently brought into the battery.

In some embodiments, the battery processing method further includes the following step.

S50. Drive the cell to move along a distribution direction of the ion air knife 40 and the cleaning member 10.

In this step, specifically, the cell is driven to move by the transfer apparatus 300.

Step S50, step S20, and step S40 may be performed simultaneously, that is, step S50, step S20, and step S40 are performed simultaneously. Understandably, while the cleaning member 10 is cleaning the surface of the cell, the cell moves along the distribution direction of the ion air knife 40 and the cleaning member 10, and the ion air knife 40 blows out ion air toward the cell to eliminate static electricity on the surface of the cell.

It should be noted herein that the distribution direction of the ion air knife 40 and the cleaning member 10 is parallel to the first direction Y.

While the cleaning member 10 is cleaning a surface of one side of the cell facing the cleaning member 10 in the second direction Z, the cell can move relative to the cleaning member 10 along the first direction Y, such that the surface of the side of the cell facing the cleaning member 10 in the second direction Z is in frictional motion relative to the cleaning member 10, allowing the cleaning member 10 to clean the surface of the side of the cell facing the cleaning member 10 in the second direction Z. That is, step S50 and step S20 are performed simultaneously, thereby helping to implement the cleaning operation in step S20.

While the ion air knife 40 is blowing out ion air toward the cell, the cell moving along the first direction Y allows the cell to move until it faces the ion air knife 40 in the second direction Z. In this way, the ion air knife 40 can blow out ion air toward one side of the cell facing the cleaning member 10 in the second direction Z so as to eliminate static electricity on the surface of the side of the cell facing the cleaning member 10 in the second direction Z. In addition, the cell may alternatively move until it is misaligned to the ion air knife 40. At this moment, the ion air knife 40 can blow out ion air toward a side surface of the cell in the first direction Y so as to eliminate static electricity on the side surface of the cell in the first direction Y With such an arrangement, step S40 and step S50 are performed simultaneously, thereby eliminating static electricity on a plurality of surfaces of the cell.

With such an arrangement, it is convenient for the cleaning member 10 to clean the surface of the cell, and an effect of eliminating static electricity on a plurality of surfaces of the cell can be achieved.

In an embodiment of this application, as shown in FIG. 1 to FIG. 5, the battery processing device 1000 includes a cleaning apparatus 100, a transfer apparatus 300, and a stacking apparatus 200. The cleaning apparatus 100 is configured to clean impurities on a surface of a cell. The stacking apparatus 200 is configured to stack the cells cleaned by the cleaning apparatus 100 to form a battery. The cleaning apparatus 100 includes a workbench 30, a driving mechanism 20, a cleaning member 10, and two groups of ion air knives 40. The driving mechanism 20, the cleaning member 10, and the two groups of ion air knives 40 are all disposed at the workbench 30, and the two groups of ion air knives 40 are separately spaced apart on two opposite sides of the cleaning member 10 along a first direction Y The cleaning member 10 is rotatably disposed at the workbench 30 to clean a surface of one side of the cell in a second direction Z, and a rotating axis of the cleaning member 10 is parallel to a third direction X. The first direction Y is perpendicular to the second direction Z, the second direction Z is perpendicular to the third direction X, and the first direction Y is perpendicular to the third direction X. Air outlets 401 of the ion air knives 40 are respectively disposed along the first direction Y and the second direction Z so as to exhaust air toward the cell. While the cleaning apparatus 100 is cleaning the surface of the cell, the transfer apparatus 300 can transfer the cell and make the cell move along the first direction Y.

The foregoing descriptions are merely optional embodiments of this application, which are not intended to limit this application. Persons skilled in the art understand that this application may have various modifications and variations. Any modification, equivalent replacement, and improvement made without departing from the spirit and principle of this application shall fall within the scope of the claims of this application.

What is claimed is:

1. A cleaning apparatus configured to clean a surface of a cell, comprising:
- a workbench having a workbench surface;
- a cleaning member movably disposed at the workbench;
- an ion air knife disposed at the workbench and spaced apart from the cleaning member in a first direction, the ion air knife comprising an air outlet facing the cleaning member workbench surface in a direction oblique to the first direction and a second direction perpendicular to the first direction, the air outlet being configured to exhaust air; and a driving mechanism disposed at the workbench and configured to drive the cleaning member to move in a plane parallel to both the first direction and a third direction, the third direction being parallel to a central axis of the cleaning member and perpendicular to the first direction and the second direction;
- wherein the workbench surface is provided with a cleaning window and an air outlet window spaced apart from each other in the first direction, the cleaning member is configured to at least partially disposed at the cleaning window, the air outlet window is configured for the ion air knife to exhaust air, and the air outlet window is provided with a protective net.

2. The cleaning apparatus according to claim 1, wherein the cleaning member is rotatable about the central axis.

3. The cleaning apparatus according to claim 1, wherein:
- the cleaning member comprises a roll shaft and a plurality of elastic strips;
- the roll shaft is connected to an output end of the driving mechanism; and
- the plurality of elastic strips are spaced apart on the roll shaft.

4. The cleaning apparatus according to claim 1, wherein the cleaning member is partially disposed inside the workbench and at least partially exceeds a surface of the workbench.

5. The cleaning apparatus according to claim 1, further comprising:
- a dust collection hood disposed at the workbench;
- wherein the dust collection hood is disposed opposite the cleaning member to receive impurities removed by the cleaning member.

6. The cleaning apparatus according to claim 5, further comprising:
- a dust sucking apparatus;
- wherein the dust sucking apparatus is connected to the dust collection hood to suck out the impurities removed by the cleaning member.

7. The cleaning apparatus according to claim 1, wherein two opposite sides of the cleaning member in the first direction each are provided with the ion air knife.

8. The cleaning apparatus according to claim 1, wherein the ion air knife is rotatably disposed at the workbench to adjust orientation of the air outlet during rotation.

9. The cleaning apparatus according to claim 8, further comprising:
- a rotating structure;
- wherein the rotating structure comprises a fixed arm disposed at the workbench and a rotating arm rotatably connected to the fixed arm, and the ion air knife is disposed on the rotating arm.

10. The cleaning apparatus according to claim 9, wherein:
- the fixed arm is provided with a first fixing hole;
- the rotating arm is provided with a second fixing hole opposite the first fixing hole;
- the first fixing hole and the second fixing hole are both spaced apart from a rotating axis of the rotating arm; and
- the first fixing hole and the second fixing hole are configured for fixation using a fastener.

11. The cleaning apparatus according to claim 1, further comprising:
- an ion fan;
- wherein an air outlet end of the ion fan is connected to the ion air knife.

12. A battery processing device, comprising the cleaning apparatus according to claim 1.

* * * * *